UNITED STATES PATENT OFFICE.

HUGH A. GALT, OF BARBERTON, OHIO.

PROCESS AND PRODUCT FOR UTILIZING NITER CAKE AND SIMILAR SUBSTANCES.

1,312,783.     Specification of Letters Patent.    Patented Aug. 12, 1919.

No Drawing. Original application filed December 15, 1917, Serial No. 207,286. Divided and this application filed December 15, 1917. Serial No. 207,287.

*To all whom it may concern:*

Be it known that I, HUGH A. GALT, citizen of the United States, residing at Barberton, in the county of Summit and State of Ohio, have invented certain new and useful Improvements in Processes and Products for Utilizing Niter Cake and Similar Substances, of which the following is a specification.

This invention relates to a process of utilizing niter cake, cylinder cake, or similar substances and to the novel compound or mixture produced therefrom by said process.

The object of the invention is to provide a process and product whereby niter cake, cylinder cake, or similar substances of comparatively low value and of little use can be converted into useful material of relatively higher value. More specifically, the object of the invention is to utilize niter cake or similar substances by mixing the same with a suitable carbonate of soda, the purpose of which will more fully appear.

The present application is a division of my co-pending application for process and product for utilizing niter cake and similar substances, filed of even date herewith, Serial No. 207,286 and the present invention relates to that specific embodiment of the invention which utilizes carbonate of sodium as the neutralizing base for the niter cake.

Niter cake is a by-product or residue in several industrial chemical processes, chief among which is the production of nitric acid from sodium nitrate. While it varies somewhat in composition it always contains a large proportion of sodium hydrogen sulfate, $NaHSO_4$ and a smaller proportion of normal sodium sulfate, $Na_2SO_4$. An average analysis of this material may, for example, run as follows:

| | |
|---|---|
| NaHSO | 78% |
| $Na_2SO_4$ | 18% |
| Moisture | 4% |
| $FeSO_4$ | Trace. |

Cylinder cake is the commercial name for a similar by-product in the manufacture of hydrochloric acid from sodium chlorid. The proportion of its ingredients may vary, but it nevertheless contains a relatively large amount of sodium hydrogen sulfate and a smaller quantity of normal sodium sulfate, for which reason, so far as this invention is concerned, it can be classed as a form or equivalent of niter cake. These substances, because of the sodium hydrogen sulfate content, are strongly acid, niter cake of the composition above stated being substantially the equivalent of sulfuric acid of approximately 32% in strength. When dissolved in hot water it produces an acid solution equivalent to approximately an 18% sulfuric acid solution.

Niter cake is a substance of comparatively low value, being usually classed with waste or worthless substances. It is of some use because of its acid effect, but nevertheless is a growing source of loss because uses have not hitherto been discovered which will take care of the tremendous quantities produced. Indeed, it is a well known fact that niter cake is produced in such large quantities that the investment for dumping land for storing the material is a large item in the cost of industrial processes, as a result of which the material can be had almost for the asking. Manufacturers almost give it away to avoid the labor and expense of handling and storing it. The same is also true of cylinder cake, but to a lesser degree.

According to the present invention the niter cake is compounded or mixed with a neutralizing base, specifically a suitable carbonate of sodium, and preferably with sufficient of said base to neutralize the acid effect of the sodium bisulfate. This quantity is easily calculated by the chemist and depends upon the proportion of bisulfate in the niter cake and the strength of the carbonate of sodium. If soda ash, $Na_2CO_3$ is selected as the neutralizing base the quantity thereof may vary from 20 to 50% of the quantity of niter cake, and for the same batch of niter cake approximately twice the quantity of bicarbonate of soda, $NaHCO_3$ is required.

While the two substances, to wit, the niter cake or other substance containing sodium hydrogen sulfate and the carbonate of sodium may be dissolved and mixed, or may be mixed in the presence of water or by fusion in a manner to produce a true chemical reaction I preferably mix them dry and in finely divided form so as to produce a homogeneous mixture. Such a mixture avoids certain difficulties encountered in the use and handling of niter cake and enables it to be prepared and stored in practically permanent form ready for use at any time. Niter cake (and by this term I mean to include cylinder cake or any other material containing a large proportion of sodium hydrogen sulfate) is deliquescent. In lump form its surface absorbs water so that it glistens and becomes syrupy. This effect is not so detrimental when the material is in lump form, but it prevents any possibility of grinding up the material to finely divided condition and storing it in such form for later use. The pile or mass of pulverized niter cake absorbs water to such a large degree as to become mushy and even liquid in form. Moreover, finely divided niter cake, after absorption of water will attack and dissolve many foreign substances in contact therewith, such as nails in the bin, as a consequence of which it becomes unsuitable for use in every process where material quantities of iron are objectionable.

The addition to the ground niter cake of a suitable carbonate of sodium as a neutralizing base is found to correct the foregoing and other deficiencies therein, even though the base is added in such a way as to be merely mechanically mixed with the niter cake and not chemically combined therewith. In other words, the neutralizing base in substantially the quantity calculated to neutralize the acid effect of the niter cake, is ground or pulverized to the same finely divided condition as the niter cake and is thoroughly mixed with the same before the niter cake has an opportunity to absorb water. Such a homogeneous mixture in dry form is found to be practically permanent, so that the material can be stored or kept in reserve for a long time and will nevertheless remain in suitable condition for use. A slight deliquescent effect may be noticed upon the surface of the pile, but this is merely a "skin" and the effect does not penetrate to any great depth. The underlying material therefore remains in dry pulverized form. Each particle of niter cake seems to be in such close contact with the surrounding particles of the neutralizing base that if any water is absorbed by the niter cake the solution thereof immediately reacts chemically with the neutralizing base, thereby converting that particular particle of sodium hydrogen sulfate into the normal sodium sulfate with the simultaneous production of the sulfate of the neutralizing base. As a result, a pile of this new material, merely mechanically mixed as aforesaid, will not dissolve iron or other neighboring substances and is therefore suitable for use in processes where it otherwise could not be used.

Recent war activities have created a large demand for what is known as salt cake, which is the commercial form of normal sodium sulfate, $Na_2SO_4$. This material contains little if any sodium hydrogen sulfate. The demand for this material is so heavy that its cost has increased from approximately $10.00 to $12.00 per ton in 1913 to $25.00 to $30.00 per ton today, with a continuing rise. Salt cake is a necessary ingredient of many materials, its uses being well known. When niter cake is mixed with the proper quantity of a suitable carbonate of sodium, as described, the product is substantially or in effect salt cake, $Na_2SO_4$, although the chemical reaction between the sodium bisulfate and the carbonate may not yet have taken place. At least it is a practical equivalent for salt cake. When the material is subsequently used in an industrial process, whatever it may be, the first effect of solution or fusion is to produce the chemical reaction between the niter cake and carbonate of sodium, thereby converting the sodium hydrogen sulfate into the normal sulfate with an evolution of carbonic acid gas. Therefore, though the mixture of the two materials may be merely mechanical the compound acts in an industrial process as though it were in fact salt cake. In practice, the two ingredients have been so compounded that an analysis thereof is practically identical with that of commercial salt cake. Indeed, the relative purity of the soda ash or bicarbonate used produces a more nearly pure salt cake than other processes from which salt cake is usually derived. Salt cake equivalent can be made in this way at materially lower cost than the market price of ordinary salt cake, due to the relatively lower cost of the niter cake, and enables manufacturers not only to save expense but to continue their several industrial processes without the use of a material the supply of which becomes more expensive.

A mechanical mixture of niter cake with carbonate of sodium produces all the desired results before mentioned, to wit, protection of the niter cake from the effects of deliquescence so that a pile of the finely divided mixture is practically permanent and remains dry. It therefore enables niter cake, cylinder cake, or like substances containing sodium bisulfate to be converted into a substance of relatively higher value, so that what has heretofore been a detriment or loss becomes a source of revenue. It also offers to the trade a new material at relatively lower cost which answers perfectly all the requirements for ordinary salt cake.

What I claim is:—

1. A new material, comprising a mechanical mixture in finely divided form of a substance containing sodium bisulfate and a carbonate of sodium.

2. A new material, comprising a mechanical mixture in finely divided form of a substance containing sodium bisulfate and a substantially sufficient quantity of a carbonate of sodium to neutralize the acid effect of the bisulfate.

3. A new material, comprising a mechanical mixture in finely divided form of niter cake and a carbonate of sodium.

4. A new material, comprising a mechanical mixture in finely divided form of the niter cake and a substantially sufficient quantity of a carbonate of sodium to neutralize the acid effect of the niter cake.

5. A new material, comprising a mechanical mixture in finely divided form of niter cake and soda ash.

6. A new material, comprising a mechanical mixture in finely divided form of niter cake and a substantially sufficient quantity of soda ash to neutralize the acid effect of the niter cake.

In testimony whereof I affix my signature.

HUGH A. GALT.